United States Patent [19]

Bouchara

[11] 3,929,792
[45] Dec. 30, 1975

[54] PHENYLPIPERAZINE DERIVATIVES, PROCESS FOR THEIR PREPARATION AND APPLICATIONS THEREOF

[76] Inventor: D. Emile Bouchara, 75 bis, Avenue Foch, 75016 Paris, France

[22] Filed: Sept. 17, 1973

[21] Appl. No.: 397,769

[30] Foreign Application Priority Data
Sept. 29, 1972 France .............................. 72.34476

[52] U.S. Cl............................ 260/268 PH; 424/250
[51] Int. Cl.$^2$......................................... C07D 295/10
[58] Field of Search............................... 260/268 PH

[56] References Cited
UNITED STATES PATENTS
3,326,916   6/1967   Creighton et al............. 260/268 PH

*Primary Examiner*—Richard J. Gallagher
*Assistant Examiner*—Jose Tovar
*Attorney, Agent, or Firm*—Young & Thompson

[57] ABSTRACT

This invention relates to new 1-(m-trifluoromethylphenyl)-4-propyl-piperazine derivatives of the general formula

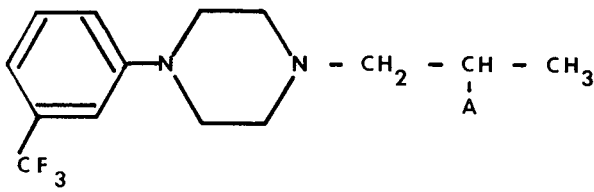

in which A represents a radical —$CH_2OR^1$, $R^1$ representing a hydrogen atom, a lower alkyl radical, a lower alkenyl radical, a lower alkynyl radical, a phenyl (lower) alkyl radical, an acyl radical or an optionally substituted carbamoyl radical, a radical

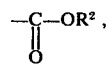

$R^2$ representing a hydrogen atom, a lower alkyl radical, a lower alkenyl radical, a lower alkynyl radical or a phenyl (lower) alkyl radical, or a radical

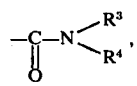

$R^3$ and $R^4$ representing independently from one another a hydrogen atom, a lower alkyl radical, a cycloalkyl radical or, together with the nitrogen atom to which they are attached, forming a 5–7 membered heterocyclic ring optionally carrying as second heteroatom an oxygen or nitrogen atom, which latter nitrogen atom may itself carry a lower alkyl radical or a m-trifluoromethylphenyl radical, and their salts with non-toxic acids and bases.

Said derivatives have analgesic, anti-inflammatory and anoretic activity.

5 Claims, No Drawings

PHENYLPIPERAZINE DERIVATIVES, PROCESS FOR THEIR PREPARATION AND APPLICATIONS THEREOF

This invention relates to new 1-(m-trifluoromethylphenyl)-4-propyl-piperazine derivatives having the general formula

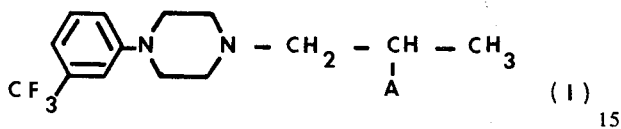
(I)

in which A represents:

a radical $-CH_2OR^1$, $R^1$ representing a hydrogen atom, a lower alkyl radical, a lower alkenyl radical, a lower alkynyl radical, a phenyl (lower) alkyl radical, an acyl radical or an optionally substituted carbamoyl radical,
a radical

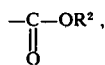

$R^2$ representing a hydrogen atom, a lower alkyl radical, a lower alkenyl radical, a lower alkynyl radical or a phenyl (lower) alkyl radical,
or a radical

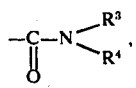

$R^3$ and $R^4$ representing independently from each other a hydrogen atom, a lower alkyl radical, a cycloalkyl radical or, together with the nitrogen atom to which they are attached, forming a 5–7 membered heterocyclic ring optionally carrying as second heteroatom an oxygen or nitrogen atom, which latter nitrogen atom may itself carry a lower alkyl radical or a m-trifluoromethylphenyl radical, and their salts with non-toxic acids and bases.

The term "lower" used above means that the radical may have up to 6 carbon atoms. The term "cycloalkyl radical" designates essentially radicals having 5–7 carbon atoms.

The heterocyclic radicals that may be formed by $R^3$ and $R^4$ include typically the radicals derived from piperidine, morpholine and piperazine.

The compounds according to the present invention may be prepared by reaction of 1-m-trifluoromethylphenyl-piperazine with a lower alkyl methacrylate to give a compound in which A is a radical

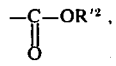

$R'^2$ being a lower alkyl radical, and optionally by conversion of this ester to other compounds of the formula (I) according to usual methods.

Thus, the acid of the formula (I) (A = COOH) may be prepared by hydrolysis of the resulting ester.

The other esters may be prepared by esterification of the acid, optionally in salt form.

The compounds of the formula (I) in which A is a radical

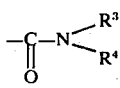

may be prepared by conversion of the acid of the formula (I) to the corresponding acid chloride and reaction of this chloride with an amine of the formula

The alcohol of the formula (I) (A = $CH_2OH$), may be prepared by reduction of the resulting ester with lithium aluminum hydride in an anhydrous solvent and hydrolysis of the product thus formed.

The ethers of said alcohol may be prepared by conversion of the alcohol to sodium alkoxide and by action on this alkoxide of a corresponding halogenated derivative.

The esters of said alcohol may be prepared by action on this alcohol of the corresponding acid chloride.

As to the urethans, these may be prepared by action on the alcohol of the corresponding isocyanate.

The compounds according to the invention possess useful pharmacological properties. In particular, they possess analgesic and/or anti-inflammatory and/or anoretic properties which make them applicable in the treatment of muscular, articular or nervous algias, dental pains, zone, migraines, rheumatic conditions, in the complementary treatment of fever or infectious conditions and for the treatment of plethoric conditions and of obesity of various origins. They are useful either by the oral, transcutaneous, rectal route or locally for topical application to the skin and mucous membranes.

Said materials may be formulated in various pharmaceutic forms such as injectable solutions or suspensions in ampoules, in multiple dose vials, as tablets, coated tablets, capsules, syrups, suppositories, ointments.

The daily dosage regimen of said compounds is within 10 mg to 2 g in adults, depending on the desired activity and on the route of administration. Their pharmaceutical usage forms such as injectable solutions, tablets, syrups, suppositories and ointments are prepared according to the usual methods.

The following examples illustrate the invention without, however, limiting same.

EXAMPLE 1

Methyl 3-[4-(m-trifluoromethylphenyl)-1-piperazinyl]-2-methyl propionate

A mixture of 1-(m-trifluoromethylphenyl)-piperazine (23 g; 0.1 M), methyl methacrylate (10 g; 0.1 M) is heated at 100°C during 16 hours in the presence of acetic acid (0.6 g; 0.01 M). The resulting mixture is distilled, to give a colorless liquid (16 g; 49%), b.p.$_{2.7}$ = 176°C, $n_D^{21°C}$ = 1.5001.

Analysis: $C_{16}H_{21}F_3N_2O_2$ (M.W. = 330.35) Calculated %: C, 58.17; H, 6.41; N, 8.48; F, 17.25. Found %: C, 58.22; H, 6.38; N, 8.67; F, 17.21.

EXAMPLE 2

3-[4-(m-Trifluoromethylphenyl)-1-piperazinyl]-2-methyl propionic acid

A mixture of methyl 3-[4-(m-trifluoromethylphenyl)-1-piperazinyl]-2-methyl propionate (32 g; 0.1 M), 1N potassium hydroxide (200 ml) and of the necessary amount of methanol to homogenize the reaction medium is refluxed during 16 hours. After cooling, the reaction mixture is neutralized with 1N hydrochloric acid (200 ml), concentrated to one-fourth its original volume and extracted with methylene chloride. The organic phase, after washing, drying and concentration, gives, on recrystallization from petroleum ether (100°–140°), 25 g (79%) of pinkish crystals, m.p. = 127°C.

Analysis: $C_{15}H_{19}F_3N_2O_2$ (M.W. = 316.32) Calculated %: C, 56.95; H, 6.05; N, 8.86; F, 18.02. Found %: C, 57.12; H, 6.12; N, 8.92; F, 17.70.

EXAMPLE 3

Sodium 3-[4-(m-trifluoromethylphenyl)-1-piperazinyl]-2-methyl propionate

To a stirred 1N sodium hydroxide solution (40 ml) is added 3-[4-(m-trifluoromethylphenyl)-1-piperazinyl]-2-methyl propionic acid (12.66 g; 0.04 M), one pinchful at a time. Stirring is continued for a further 2 hours. A small pinchful of acid is then added to insure completion of the salt formation, after which the reaction mixture is filtered to remove excess acid, ethanol is added thereto and the mixture is then concentrated to dryness. This addition and evaporation of the water-ethanol azeotrope operation is repeated several times until there are obtained dry white crystals which are then dried 24 hours in vacuo, over $P_2O_5$, to give 10.7 g (79%) of white crystals, m.p. = 197°C.

Analysis: $C_{15}H_{18}F_3N_2NaO_2$ (M.W. = 338.31) Calculated %: C, 53.25 H, 5.36; N, 8.28; F, 16.85; Na, 6.80. Found %: C, 53.30 H, 5.45; N, 8.25; F, 16.57; Na, 6.87.

EXAMPLE 4

Ethyl 3-[4-(m-trifluoromethylphenyl)-1-piperazinyl]-2-methylpropionate

Ethyl bromide (13.10 g; 0.12 M) diluted in DMF (30 ml) is added dropwise, with stirring, to dry sodium 3-[4-(m-trifluoromethylphenyl)-1-piperazinyl]-2-methyl propionate (10.15 g; 0.03 M) suspended in DMF (20 ml). After reacting dyring 8 hours at 80°C, the reaction mixture is concentrated to dryness, taken up into water, basified and extracted with ether. The resulting organic phase is washed with water, dried and concentrated to give an orange oil which is purified by the usual methods, giving 6.95 g (62%) of colorless liquid, b.p.$_{0.3}$ = 136°C, $n_D^{20.5°C}$ = 1.4956

Analysis: $C_{17}H_{23}F_3N_2O_2$ (M.W. = 344.37) Calculated %: C, 59.29; H, 6.73; N, 8.14; F, 16.55. Found %: C, 59.29; H, 6.80; N, 8.35; F, 16.39.

EXAMPLE 5 n-Propyl 3-[4-(m-trifluoromethylphenyl)-1-piperazinyl]-2-methyl propionate

The procedure of Example 4 is used, to give a yellowish liquid, b.p.$_{0.5}$ = 150°C, $n_D^{21°C}$ = 1.4928

Analysis: $C_{18}H_{25}F_3N_2O_2$ (M.W. = 358.40) Calculated %: C, 60.32; H, 7.03; N, 7.82; F, 15.90. Found %: C, 60.24; H, 7.00; N, 7.71; F, 15.56.

EXAMPLE 6 n-Propyl 3-[4-(m-trifluoromethylphenyl-1-piperazinyl]-2-methyl-propionate fumarate A mixture of n-propyl 3-[4-(m-trifluoromethylphenyl)-1-piperazinyl]-2-methyl propionate (16.23 g; 0.034 M), fumaric acid (5.28 g; 0.034 M) in ethanol (100 ml) is refluxed during two hours. The crystals obtained on cooling are suction filtered, washed with anhydrous diethyl ether and dried, to give 12 g (42%) of white crystals, m.p. = 140°C.

Analysis: $C_{22}H_{29}F_3N_2O_6$ (M.W. = 474.47) Calculated, %: C, 55.69; H, 6.16; N, 5.91; F, 12.01. Found, %: C, 55.81; H, 6.23; N, 6.00; F, 11.81.

EXAMPLE 7

Isopropyl 3-[4-(m-trifluoromethylphenyl)-1-piperazinyl]-2-methyl propionate

The procedure of Example 4 is used, to give a pale yellow liquid, b.p.$_{0.2}$ = 144°C, $n_D^{24°C}$ = 1.4900

Analysis: $C_{18}H_{25}F_3N_2O_2$ (M.W. = 358.40) Calculated %: C, 60.32; H, 7.03; N, 7.82; F, 15.90. Found %: C, 60.09; H, 7.18; N, 7.87; F, 15.82.

EXAMPLE 8 n-Butyl 3-[4-(m-trifluoromethylphenyl)-1-piperazinyl]-2-methyl propionate

The procedure of Example 1 is used, using n-butyl methacrylate, or the procedure of Example 4 using sodium 3-[4-(m-trifluoromethylphenyl)-1-piperazinyl]-2-methyl propionate and n-butyl bromide, to give a yellow liquid b.p.$_{0.3}$ = 155°C, $n_D^{21°C}$ = 1.4920.

Analysis: $C_{19}H_{27}F_3N_2O_2$ (M.W. = 372.43) Calculated %: C, 61.27; H, 7.31; N, 7.52; F, 15.30. Found %: C, 61.29; H, 7.24; N, 7.73; F, 15.24.

EXAMPLE 9 n-Butyl 3-[4-(m-trifluoromethylphenyl)-1-piperazinyl]-2-methyl-propionate fumarate The procedure of Example 6 is used, to give white crystals, m.p. = 113°C.

Analysis: $C_{23}H_{31}F_3N_2O_6$ (M.W. = 488.49) Calculated %: C, 56.55; H, 6.40; N, 5.73; F, 11.67. Found %: C, 56.26; H, 6.35; N, 5.78; F, 11.50.

EXAMPLE 10

Allyl 3-[4-(m-trifluoromethylphenyl-1-piperazinyl]-2-methyl propionate

The procedure of Example 4 is used, to give a light yellow liquid, b.p.$_{0.3}$ = 144°C, $n_D^{21°C}$ = 1.5028

Analysis: $C_{18}H_{23}F_3N_2O_2$ (M.W. = 356.38) Calculated %: C, 60.66; H, 6.50; N, 7.86; F, 15.99. Found %: C, 60.55; H, 6.45; N, 7.93; F, 15.99.

EXAMPLE 11

Allyl 3-[4-(m-trifluoromethylphenyl)-1-piperazinyl]-2-methyl-propionate fumarate The procedure of Example 6 is used, to give white crystals m.p. = 112°C.

Analysis: $C_{22}H_{27}F_3N_2O_6$ (M.W. = 472.45) Calculated %: C, 55.92; H, 5.76; N, 5.93; F, 12.06. Found %: C, 55.79; H, 5.83; N, 5.99; F, 11.94.

EXAMPLE 12

Propargyl 3-[4-(m-trifluoromethylphenyl)-1-piperazinyl]-2-methyl propionate

The procedure of Example 4 is used, to give a pale yellow liquid $n_D^{18°C}$ = 1.5090

Analysis: $C_{18}H_{21}F_3N_2O_2$ (M.W. = 354.37) Calculated %: C, 61.00; H, 5.97; N, 7.91; F, 16.08. Found %: C, 60.51; H, 5.95; N, 8.23; F, 16.05.

EXAMPLE 13

Benzyl 3-[4-(m-trifluoromethylphenyl)-1-piperazinyl]-2-methyl propionate

The procedure of Example 4 is used, to give a light yellow liquid, b.p.$_{0.4}$ = 200°C, $n_D^{20°C}$ = 1.5320

Analysis: $C_{22}H_{25}F_3N_2O_2$ (M.W. = 406.44) Calculated %: C, 65.01; H, 6.20; N, 6.89; F, 14.02. Found %: C, 65.14; H, 6.13; N, 6.98; F, 14.05.

EXAMPLE 14

3-[4-(m-Trifluoromethylphenyl)-1-piperazinyl]-2-methyl-1-propanol

To lithium aluminum hydride (3.8 g; 0.1M) suspended in anhydrous ether (100 ml) are added dropwise, with stirring, 33 g (0.1M) methyl 3-[4-(m-trifluoromethylphenyl)-1-piperazinyl]-2-methyl propionate in anhydrous ether (100 ml). On completion of the addition, the reaction mixture is refluxed during 2 hours, after which it is cooled and hydrolyzed. The resulting ethereal phase is dried and then concentrated to give, on recrystallization from hexane, 16.3 g (54%) of white crystals, m.p. = 88°C.

Analysis: $C_{15}H_{21}F_3N_2O$ (M.W. = 302.24) Calculated %: C, 59.58; H, 7.00; N, 9.27; F, 18.85. Found %: C, 59.84; H, 7.02; N, 9.35; F, 18.79.

EXAMPLE 15

Difumarate of 3-[4-(m-trifluoromethylphenyl)-1-piperazinyl]-2-methyl propyl 3-[4-(m-trifluoromethylphenyl)-1-piperazinyl]-2-methyl propionate The free base is obtained by reacting 3-[4-(m-trifluoromethylphenyl)-1-piperazinyl]-2-methyl propanoyl chloride (obtained by action of thionyl chloride on the corresponding acid) with 3-[4-(m-trifluoromethylphenyl)-1-piperazinyl]-2-methyl-1-propanol within anhydrous benzene, in the presence of triethylamine. The difumarate is then prepared by heating stoichiometric amounts of the above free base and of fumaric acid within ethanol (Example 6). Cream colored crystals, m.p. = 144°C.

Analysis: $C_{38}H_{46}F_6N_4O_{10}$ (M.W. = 832.78) Calculated %: C, 54.80; H, 5.57; N, 6.73; F, 13.68. Found %: C, 54.54; H, 5.58; N, 7.01; F, 13.62.

EXAMPLE 16

4-(m-Trifluoromethylphenyl)-1-[(3-cyclohexylaminocarbonyloxy-2-methyl)propyl]-piperazine hydrochloride A mixture of 3-[4-(m-trifluoromethylphenyl)-1-piperazinyl]-2-methyl-1-propanol (12.08 g; 0.04 M), cyclohexyl isocyanate (15 g; 0.12 M) and triethylamine (1.9 g; 0.019 M) in anhydrous benzene (50 ml) is refluxed during 16 hours. The reaction mixture is then concentrated to dryness, taken up into bicarbonated water and extracted with ether. The resulting organic phase is washed, dried and concentrated to dryness, to give a liquid material which is converted to the hydrochloride with hydrochloric acid in ethereal solution. Recrystallization from ethanol-ethyl acetate 1:1 gives 11.1 g (60%) of white crystals, m.p. = 200°C.

Analysis: $C_{22}H_{33}ClF_3N_3O_2$ (M.W. = 463.97) Calculated %: C, 56.95; H, 7.17; N, 9.06; F, 12.28; Cl, 7.64. Found %: C, 57.05; H, 7.18; N, 9.23; F, 12.10; Cl, 7.49.

EXAMPLE 17

[3(4-(m-trifluoromethylphenyl-1-piperazinyl)-2-methyl]-propyl 3-pyridine-carboxylate fumarate Nicotinoyl chloride hydrochloride is prepared by adding slowly thionyl chloride (40 ml) to nicotinic acid (7.38 g; 0.06M), with stirring, and the resulting mixture is heated at 60°C during 16 hours. The reaction mixture is then concentrated to dryness and the last traces of thionyl chloride are removed by repeated evaporations of anhydrous benzene. To the resulting nicotinoyl chloride hydrochloride, suspended in benzene (20 ml) is added, with stirring, a solution of 3-[4-(m-trifluoromethylphenyl)-1-piperazinyl]-2-methyl-propanol (18.12 g; 0.06 M) and triethylamine (12 G; 0.12 M) in benzene (40 ml). The resulting reaction mixture is then heated at 60°C (during 16 hours), concentrated and, after addition of water, is extracted with methylene chloride. The organic phase is washed, dried and concentrated, to give a liquid which is purified through a column of silica. The fumarate is prepared as in Example 6, to give 9 g (55%) of white crystals, m.p. = 164°C.

Analysis: $C_{25}H_{28}F_3N_3O_6$ (M.W. = 523.49) Calculated %: C, 57.35; H, 5.39; N, 8.02; F, 10.89. Found %: C, 57.26; H, 5.39; N, 7.95; F, 11.29.

EXAMPLE 18

4-(m-Trifluoromethylphenyl)-1-(3-benzyloxy-2-methyl-propyl)-piperazine

To a 50% dispersion of sodium hydride (2.4 g; 0.05 M) in mineral oil, suspended in anhydrous DMF (40 ml) is added dropwise, with stirring, 3-[4-(m-trifluoromethylphenyl)-1-piperazinyl]-2-methyl-1-propanol (15.1 g; 0.050 M) dissolved in DMF (50 ml). On completion of the addition, the reaction mixture is heated during one hour at 50°C to insure the complete formation of the intermediate alkoxide after which benzyl chloride (8.85 g; 0.07 M) dissolved in DMF (20 ml) is added dropwise thereto. The reaction is allowed to proceed during 16 hours at 50°C, after which the reaction mixture is concentrated to dryness, water is added thereto (neutral pH) and it is then extracted with methylene chloride. The washed, dried and concentrated organic phase gives 22 g of dark yellow liquid in which thin layer chromatographic analysis shows the presence of two products, including the presence of the starting material. Column chromatography through silica, using a CHCl$_3$ (9 parts) — CH$_3$COCH$_3$ (1 part) system as eluent, isolates 11 g (56%) of clear yellow liquid, $n_D^{20.5°C} = 1.5300$.

Analysis: C$_{22}$H$_{27}$F$_3$N$_2$O (M.W. = 392.46) Calculated %: C, 67.32; H, 6.93; N, 7.14; F, 14.52. Found %: C, 67.36; H, 6.99; N, 7.21; F, 14.51.

EXAMPLE 19

4-(m-Trifluoromethylphenyl)-1-(3-benzyloxy-2-methyl-propyl)-piperazine fumarate

The procedure of Example 6 is used, to give white crystals, m.p. = 120°–121°C.

Analysis: C$_{26}$H$_{31}$F$_3$N$_2$O$_5$ (M.W. = 508.53) Calculated %: C, 61.41; H, 6.14; N, 5.50; F, 11.21. Found %: C, 61.42; H, 6.32; N, 5.48; F, 11.00.

EXAMPLE 20

4-(m-Trifluoromethylphenyl)-1-(3-ethoxy-2-methyl-propyl)-piperazine fumarate

The free base is obtained as in Example 18. The fumarate is prepared as in Example 6. White crystals, m.p. 121°C.

Analysis: C$_{21}$H$_{29}$F$_3$N$_2$O$_5$ (M.W. = 446.46) Calculted %: C, 56.49; H, 6.55; N, 6.28; F, 12.76. Found %: C, 56.84; H, 6.75; N, 6.34; F, 12.22.

EXAMPLE 21

4-(m-Trifluoromethylphenyl)-1-(3-allyloxy-2-methyl-propyl)piperazine

The procedure of example 18 is used. Yellow liquid, $n_D^{24°C} = 1.500$.

Analysis: C$_{18}$H$_{25}$F$_3$N$_2$O (M.W. = 342.40) Calculated %: C, 63.14; H, 7.36; N, 8.18; F, 16.65. Found %: C, 62.97; H, 7.26; N, 8.08; F, 16.42.

EXAMPLE 22

4-(m-Trifluoromethylphenyl)-1-(3-propargyloxy-2-methyl-propyl)-piperazine

The procedure of Example 18 is used. Brown liquid, $n_D^{21°C} = 1.5028$.

Analysis: C$_{18}$H$_{23}$F$_3$N$_2$O (M.W. = 340.38) Calculated %: C, 63.51; H, 6.81; N, 8.23; F, 16.75. Found %: C, 63.14; H, 6.81; N, 8.17; F, 16.50.

EXAMPLE 23

N-Isopropyl-3-[4-(m-trifluoromethylphenyl)-1-piperazinyl]-2-methyl propionamide

Thionyl chloride (100 ml) is added dropwise, with stirring and at ambient temperature to 3-[4-(m-trifluoromethylphenyl-1-piperazinyl]-2-methyl propionic acid (20.8 g; 0.066 M), and the mixture is allowed to react at room temperature during 16 hours. It is then concentrated to dryness and the last traces of thionyl chloride are removed by successive evaporations of anhydrous benzene. The resulting acid chloride is suspended in anhydrous benzene (100ml) and isopropylamine (8.5 g; 0.14 M) is then added dropwise thereto. The resulting material is refluxed during 16 hours, with vigorous stirring. On completion of the reaction, the reaction mixture is taken up into water, basified with sodium bicarbonate and extracted with ether. The resulting organic phase is washed with water until neutral, dried and concentrated, to give a brown material which is purified by chromatography through a silica column.

There are finally obtained 6 g (26%) of light brown crystals, m.p. = 101°C.

Analysis: C$_{18}$H$_{26}$F$_3$N$_3$O (M.W. = 357.41) Calculated %: C, 80.49; H, 7.33; N, 11.76; F, 15.94. Found %: C, 80.21; H, 7.34; N, 11.67; F, 15.79.

EXAMPLE 24

N{3-[4-(m-trifluoromethylphenyl)-1-piperazinyl]-2-methylpropanoyl} cyclohexylamine The procedure of Example 23 is used. Cream crystals, m.p. = 148°C.

Analysis: C$_{21}$H$_{30}$F$_3$N$_3$O (M.W. = 397.47) Calculated %: C, 63.45; H, 7.61; N, 10.57; F, 14.34. Found %: C, 63.43; H, 7.68; N, 10.66; F, 14.47.

EXAMPLE 25

N{3-[4-(m-Trifluoromethylphenyl)-1-piperazinyl]-2-methylpropanoyl} piperidine fumarate The free base is obtained as in Example 23. The fumarate is prepared as in Example 6. White crystals, m.p. = 137°C.

Analysis: C$_{24}$H$_{32}$F$_2$N$_3$O$_5$ (M.W. = 499.51) Calculated %: C, 57.70; H, 6.46; N, 8.41; F, 11.41. Found %: C, 57.56; H, 6.48; N, 8.26; F, 11.09.

EXAMPLE 26

N 3-[4-(m-Trifluoromethylphenyl)-1-piperazinyl]-2-methylpropanoyl morpholine difumarate The free base is obtained as in Example 23. The difumarate is prepared as in Example 6. Light yellow crystals, m.p. = 133°C.

Analysis: C$_{27}$H$_{34}$F$_3$N$_3$O$_{10}$ (M.W. = 617.56) Calculated %: C, 52.50; H, 5.55; N, 6.80; F, 9.23. Found %: C, 52.10; H, 5.40; N, 6.78; F, 9.37.

EXAMPLE 27

3-[4-(m-Trifluoromethylphenyl)-1-piperazinyl]-2-methyl-1-propanoyl-4-methyl piperazine difumarate The procedure of Example 23 is used. The product is isolated as the difumarate. White crystals, m.p. = 190°C.

Analysis: C$_{28}$H$_{37}$F$_3$N$_4$O$_9$ (M.W. = 630.61) Calculated %: C, 53.33; H, 5.91; N, 8.89; F, 9.04. Found %: C, 52.86; H, 5.85; N, 8.91; F, 8.85.

EXAMPLE 28

3-[4-(m-Trifluoromethylphenyl-1-piperazinyl]-2-methyl-1-propanoyl-4-(m-trifluoromethylphenyl)-piperazine fumarate The procedure of Example 23 is used, and the product is isolated as the fumarate. White crytals, m.p. = 136°C.

Analysis: $C_{30}H_{34}F_6N_4O_5$ (M.W. = 644.61) Calculated %: C, 55.89; H, 5.32; N, 8.69; F, 17.68. Found %: C, 55.82; H, 5.43; N, 8.98; F, 17.83.

The results of a pharmacological investigation of the compounds of this invention are given below.

1. Acute Toxicity Determination

Acute toxicity was determined in mice on oral administration of a single dose of the test materials. The mean lethal dose ($LD_{50}$) was calculated according to the method described by BEHRENS and KARBER after 48 hours of observation.

2. Investigation of the Anoretic Activity

The anoretic activity was determined in adult male rats, under the following conditions: the animals, placed in individual cages, were accustomed to take the total amount of their food during seven consecutive hours. Food consumption is calculated by weighing at 1 hour, 3 hours, 5 hours and 7 hours. Drinking water is offered "ad libitum."

The compounds are administered dissolved or suspended in a 1/100 methyl cellulose solution, one hour prior to supplying the food. A lot of reference animals is given only the methyl cellulose solution.

The anoretic activity is expressed as percent inhibition of food consumption with respect to the days without treatment.

3. Investigation of the Anti-Inflammatory Activity

The anti-inflammatory activity was determined by means of the carrhageenin-induced inflammatory oedema test in rats, according to the technique described by WINTER and coll. (Proc. Soc. Exp. Bio. 111, 544, 1962).

The test materials are administered orally at time 0 as a suspension in a methyl cellulose solution. The inflammatory process is initiated one hour later, on plantar subfascial injection of the challenging agent.

Evolution of the oedema is followed by mercury plethysmographic examination during the next four hours. The anti-inflammatory activity is expressed as protection percent with respect to the controls.

4. Investigation of the Analgesic Activity

The analgesic activity was determined by means of the inhibition test of the peritoneal pain induced by injection of acetic acid. This is carried out according to the technique described by KOSTER and co-workers (Fed. Proc., 18, 412, 1959).

It comprises inducing in mice, on intraperitoneal injection of acetic acid, a diffuse pain syndrome which is evidenced by writhing and stretching motions.

The test materials are administered orally, thirty minutes prior injection of the challenging agent. The writhing and stretching motions are counted during fifteen minutes and the analgesic activity is expressed as percent protection with respect to control animals given only the challenging injection.

All the results obtained are summarized in the following Table.

| Compound of Example N° | $LD_{50}$ mg/kg p.o. | Dose mg/kg p.o. | ANORETIC ACTIVITY % Inhibition after 1 h | after 3 h | after 5 h | after 7 h | ANTI-INFLAMMATORY ACTIVITY Dose mg/kg p.o. | % protection | ANALGESIC ACTIVITY Dose mg/kg p.o. | % protection |
|---|---|---|---|---|---|---|---|---|---|---|
| 1 | 728 | 50 | − 84 | − 82 | − 79 | − 62 | 73 | 35 | 9 | 67 |
|  |  | 20 | − 88 | − 70 | − 44 | − 26 |  |  |  |  |
| 2 | 880 | 50 | − 89 | − 91 | − 93 | − 82 | 88 | 30 | 11 | 66 |
| 3 | 728 | 50 | − 67 | − 65 | − 52 | − 42 | 73 | 25.5 | 9 | 44 |
| 4 | 880 | 50 | − 71 | − 32 | − 32 | − 24 | 88 | 55 | 22 | 62 |
| 5 | 1200 | 100 | −100 | − 95 | − 96 | − 95 | 120 | 45 | 30 | 64 |
|  |  | 50 | − 91 | − 90 | − 86 | − 77 |  |  |  |  |
| 6 | 1200 | 100 | −100 | − 87 | − 69 | − 49 | 120 | 33 | 60 | 64 |
|  |  | 50 | − 93 | − 67 | − 20 | − 10 |  |  |  |  |
| 7 | 728 | 50 | −100 | − 69 | − 58 | − 42 | 73 | 39 | 9 | 52 |
| 8 | 2400 | 100 | −100 | −100 | −100 | −100 | 240 | 49 | 7.5 | 50 |
|  |  | 50 | −100 | − 85 | − 65 | − 42 |  |  |  |  |
| 9 | 4370 | 100 | − 85 | − 73 | − 60 | − 51 | 290 | 26 | 18 | 71 |
| 10 | 1200 | 100 | −100 | − 98 | − 97 | − 96 | 120 | 54 | 30 | 64 |
|  |  | 50 | −100 | −100 | − 92 | − 64 |  |  |  |  |
| 11 | 1470 | 100 | − 88 | − 82 | − 80 | − 76 | 178 | 57 | 89 | 83 |
|  |  |  |  |  |  |  |  |  | 20 | 35 |
| 12 | 440 | 20 | − 97 | − 61 | − 27 | − 6 | 44 | 25 | 22 | 52 |
| 13 | 3200 | 100 | − 89 | − 88 | − 83 | − 57 | 320 | 36 | 40 | 62 |
| 14 | 880 | 50 | − 80 | − 62 | − 44 | − 31 | 88 | 15 | 11 | 43 |
| 15 | 2400 | 100 | −100 | − 86 | − 76 | − 61 | 240 | 52 | 120 | 62 |
| 16 | 1200 | 100 | −100 | − 92 | − 89 | − 78 | 120 | 39 | 30 | 53 |
| 17 | 2400 | 100 | − 97 | − 91 | − 63 | − 27 | 320 | 45 | 5 | 63 |
| 18 | 3200 | 200 | −100 | −100 | − 97 | − 98 | 320 | 59 | 40 | 91 |
|  |  | 100 | − 43 | − 12 | − 6 | + 11 | 160 | 41 |  |  |
| 19 | 1460 | 100 | − 79 | − 34 | − 22 | − 15 | 146 | 31 | 20 | 58 |
| 20 | 440 | 20 | + 7 | + 8 | + 1 | + 10 | 44 | 17 | 44 | 36 |
| 21 | 880 | 50 | − 94 | − 91 | − 55 | − 40 | 88 | 46 | 22 | 58 |
| 22 | 1200 | 100 | − 80 | − 78 | − 58 | − 34 | 120 | 52 | 15 | 51 |
| 23 | 1200 | 100 | − 81 | − 44 | − 25 | − 6 | 120 | 27 | 15 | 72 |
| 24 | 3200 | 100 | − 69 | − 14 | − 4 | + 14 | 320 | 0 | 160 | 60 |
| 25 | 728 | 50 | + 11 | − 10 | − 8 | + 17 | 73 | 32 | 36.5 | 54 |
| 26 | 880 | 50 | − 18 | − 11 | − 3 | + 12 | 88 | 0 | 44 | 72 |
|  |  |  |  |  |  |  |  |  | 30 | 74 |
| 27 | 1200 | 100 | − 30 | − 13 | − 10 | − 6 | 120 | 7 | 15 | 35 |
| 28 | 3200 | 50 | − 29 | − 11 | + 2 | + 8 | 100 | 23 | 50 | 55 |

The various activities of the compounds of this invention were investigated with respect to reference materials. For the determination of the anoretic activity, the reference material was fenproporex hydrochloride (oral $LD_{50}$ 65 mg/kg) which, under the operating conditions used and at a dosage of 10 mg/kg by the oral route, gives the following values of percent inhibition of food intake: after 1 hour, 92; after 3 hours, 48; after 5 hours, 29; after 7 hours, 9. Concerning the anti-inflammatory activity, the reference material was indometacine (oral $LD_{50}$ 50 mg/kg) which, under the operation conditions used and at a dosage of 5 mg/kg gives 30 percent protection. With respect to the analgesic activity, the reference material was acetylsalicyclic acid (oral $LD_{50}$ 1500 mg/kg) which, under the operating conditions used and at a dosage of 100 mg/kg provides 60% protection.

It is understood that the invention encompasses within its scope pharmaceutical compositions comprising at least one of the therapeutically active compounds included within the scope of the general formula (I), optionally in combination with one or more other active ingredients.

Having now described my invention what I claim as new and desire to secure by Letters Patent is:

1. A compound of the formula

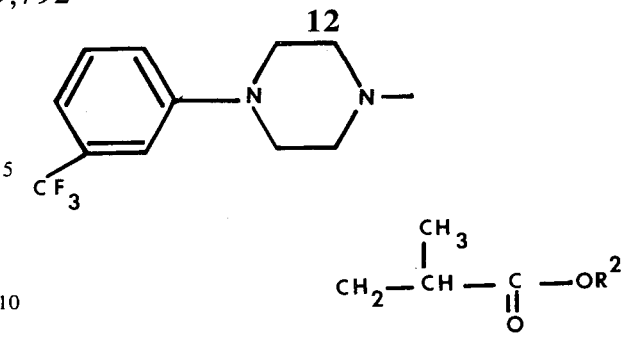

in which $R^2$ is a radical selected from the group consisting of hydrogen, lower alkyl, allyl, propargyl, phenyl (lower) alkyl and 3-[4-(m-trifluoromethylphenyl)-1-piperazinyl]-2-methyl-propyl, or its salts with therapeutically acceptable acids and bases.

2. 3-[4-(m-Trifluoromethyl phenyl)-1-piperazinyl]-2-methyl-propionic acid.

3. n-Propyl 3-[4-(m-trifluoromethyl phenyl)-1-piperazinyl]-2-methyl-propionate or its fumarate.

4. n-Butyl 3-[4-(m-trifluoromethyl phenyl)-1-piperazinyl]-2-methyl propionate or its fumarate.

5. Allyl 3-[4-(m-trifluoromethylphenyl)-1-piperazinyl]-2-methyl propionate or its fumarate.

* * * * *